(12) United States Patent
Park et al.

(10) Patent No.: US 11,265,263 B2
(45) Date of Patent: Mar. 1, 2022

(54) PROCESSING DATA USING REMOTE NETWORK COMPUTING RESOURCES

(71) Applicant: QUALCOMM incorporated, San Diego, CA (US)

(72) Inventors: Hee Jun Park, San Diego, CA (US); Huang Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/882,629

(22) Filed: May 25, 2020

(65) Prior Publication Data
US 2021/0367904 A1 Nov. 25, 2021

(51) Int. Cl.
*G06F 13/00* (2006.01)
*H04L 47/70* (2022.01)
*H04L 43/0864* (2022.01)

(52) U.S. Cl.
CPC .......... *H04L 47/82* (2013.01); *H04L 43/0864* (2013.01)

(58) Field of Classification Search
CPC . H04L 43/0864; H04L 43/0852; H04L 43/08; H04L 47/82; H04L 43/04; H04L 41/083; H04W 24/02; G06F 9/46
USPC .............................. 709/224, 223; 718/1, 100
See application file for complete search history.

(56) References Cited

U.S. PATENT DOCUMENTS

| 6,717,917 | B1* | 4/2004 | Weissberger | H04L 41/142 370/252 |
| 7,123,616 | B2* | 10/2006 | Weissberger | H04J 3/0682 370/389 |
| 8,028,292 | B2* | 9/2011 | Inoue | G06F 9/5088 718/105 |
| 8,391,870 | B1* | 3/2013 | Singh | H04W 36/00837 455/436 |
| 9,906,453 | B2* | 2/2018 | Vincent | H04L 47/17 |
| 9,948,561 | B2* | 4/2018 | VerSteeg | H04L 47/12 |
| 10,049,327 | B2* | 8/2018 | Mohammad Mirzaei | G06F 9/542 |
| 10,692,383 | B1* | 6/2020 | Wang | H04W 4/46 |
| 2004/0264434 | A1* | 12/2004 | Weissberger | H04J 3/0682 370/350 |
| 2006/0190942 | A1* | 8/2006 | Inoue | G06F 9/5088 718/100 |

(Continued)

FOREIGN PATENT DOCUMENTS

WO 2006083043 A2 8/2006

OTHER PUBLICATIONS

International Search Report and Written Opinion—PCT/US2021/025536—ISA/EPO—dated Jun. 21, 2021 16 pages.

*Primary Examiner* — Kenneth R Coulter
(74) *Attorney, Agent, or Firm* — The Marbury Law Group, PLLC

(57) ABSTRACT

Embodiments include methods for managing the processing of data and performing computing tasks of a wireless device using computing resources of a remote network computing device. A wireless device and a network computing device may dynamically track factors affecting a round-trip latency of a computing task. The wireless device and the network computing device may generate and send metadata including the factors and a latency budget for the computing task. The wireless device and the network computing device may adjust a processing time for processing data related to the computing task based the received metadata and the latency budget.

22 Claims, 16 Drawing Sheets

(56) References Cited

U.S. PATENT DOCUMENTS

| | | | |
|---|---|---|---|
| 2016/0171390 A1* | 6/2016 | Mohammad Mirzaei | G06N 20/00 706/12 |
| 2016/0308769 A1* | 10/2016 | VerSteeg | H04L 43/0894 |
| 2017/0142014 A1* | 5/2017 | Vincent | H04L 43/0864 |
| 2017/0289000 A1* | 10/2017 | Park | G06F 11/3058 |
| 2020/0120519 A1* | 4/2020 | Horton | H04L 41/0663 |

* cited by examiner

PROCESSING DATA USING REMOTE NETWORK COMPUTING RESOURCES

BACKGROUND

Some computing tasks place high demands on the relatively limited processing capabilities of modern wireless devices. In some situations, a wireless device may avail itself of high-speed wireless communications and network computing resources to offload processor-intensive computing tasks to a computing device deeper in the network, such as a server device. However, offloading computing tasks to a network computing device incurs latency due to both the time required to perform remote processing and information travel time over communication links. This introduced latency may prove unacceptable for the performance of certain applications and services, especially those affecting health and safety.

SUMMARY

Various aspects include systems and methods of wireless communications performed by a processor of a wireless device for leveraging remote computing resources. Various aspects may include determining factors affecting a round-trip latency of a computing task, generating first metadata including the determined factors and a latency budget for the computing task, sending the first metadata and data to a remote network computing device for processing as part of the computing task, receiving from the network computing device processed data of the computing task and second metadata including an indication of a remaining time in the latency budget, and adjusting a processing time for post-processing the processed data based on the second metadata to complete the post-processing of the processed data within the latency budget.

In some aspects, determining factors affecting a round-trip latency of a computing task may include determining one or more of a wireless device pre-processing time, a first communication time from the wireless device to the remote network computing device, a remote network computing device processing time, a second communication time from the remote network computing device to the wireless device, or a wireless device post-processing time.

In some aspects, adjusting a processing time for post-processing the processed data based on the second metadata to complete the post-processing of the processed data within the latency budget may include adjusting a dynamic clock and voltage scaling (DCVS) and a dynamic task priority assignment of the processed data based on a time remaining in the latency budget. In some aspects, adjusting a processing time for post-processing the processed data based on the second metadata to complete the post-processing of the processed data within the latency budget may include adjusting a DCVS and a task queue position of the processed data based on a time remaining in the latency budget.

In some aspects, the processed data of the computing task received from the remote network computing device may not be a completed work product. Some aspects may include adjusting a compression ratio of the data for processing as part of the computing task based on the determined factors and the latency budget.

Various aspects include systems and methods performed by a network computing device for processing data in support of a remote wireless device. Various aspects may include receiving metadata and data for processing as part of a computing task from a remote wireless device, the first metadata including factors affecting a round-trip latency and a latency budget for the computing task, adjusting a processing time for processing the data based on the first metadata and the latency budget, generating second metadata including an indication of a remaining time in the latency budget, and sending processed data and the second metadata to the remote wireless device in a format that enables post-processing by the remote wireless device.

In some aspects, receiving first metadata and data for processing as part of a computing task from the wireless device may include receiving one or more of a remote wireless device pre-processing time, a first communication time from the remote wireless device to the network computing device, a network computing device processing time, a second communication time from the network computing device to the remote wireless device, or a remote wireless device post-processing time.

In various aspects, adjusting the processing time for processing the data based on the first metadata and the latency budget may include adjusting a dynamic clock and voltage scaling (DCVS) and a dynamic task priority assignment of the data based on a time remaining in the latency budget. In various aspects, adjusting a processing time for processing the data based on the first metadata and the latency budget may include adjusting a DCVS and a task queue position of the data based on a time remaining in the latency budget. Various aspects may include adjusting a compression ratio of the processed data based on the factors affecting the round-trip latency and the latency budget.

Further aspects include a wireless device having a processor configured to perform one or more operations of any of the methods summarized above. Further aspects include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a network computing device having a processor configured to perform one or more operations of any of the methods summarized above. Further aspects include a non-transitory processor-readable storage medium having stored thereon processor-executable instructions configured to cause a processor of a network computing device to perform operations of any of the methods summarized above. Further aspects include a network computing device having means for performing functions of any of the methods summarized above. Further aspects include a system on chip for use in a network computing device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
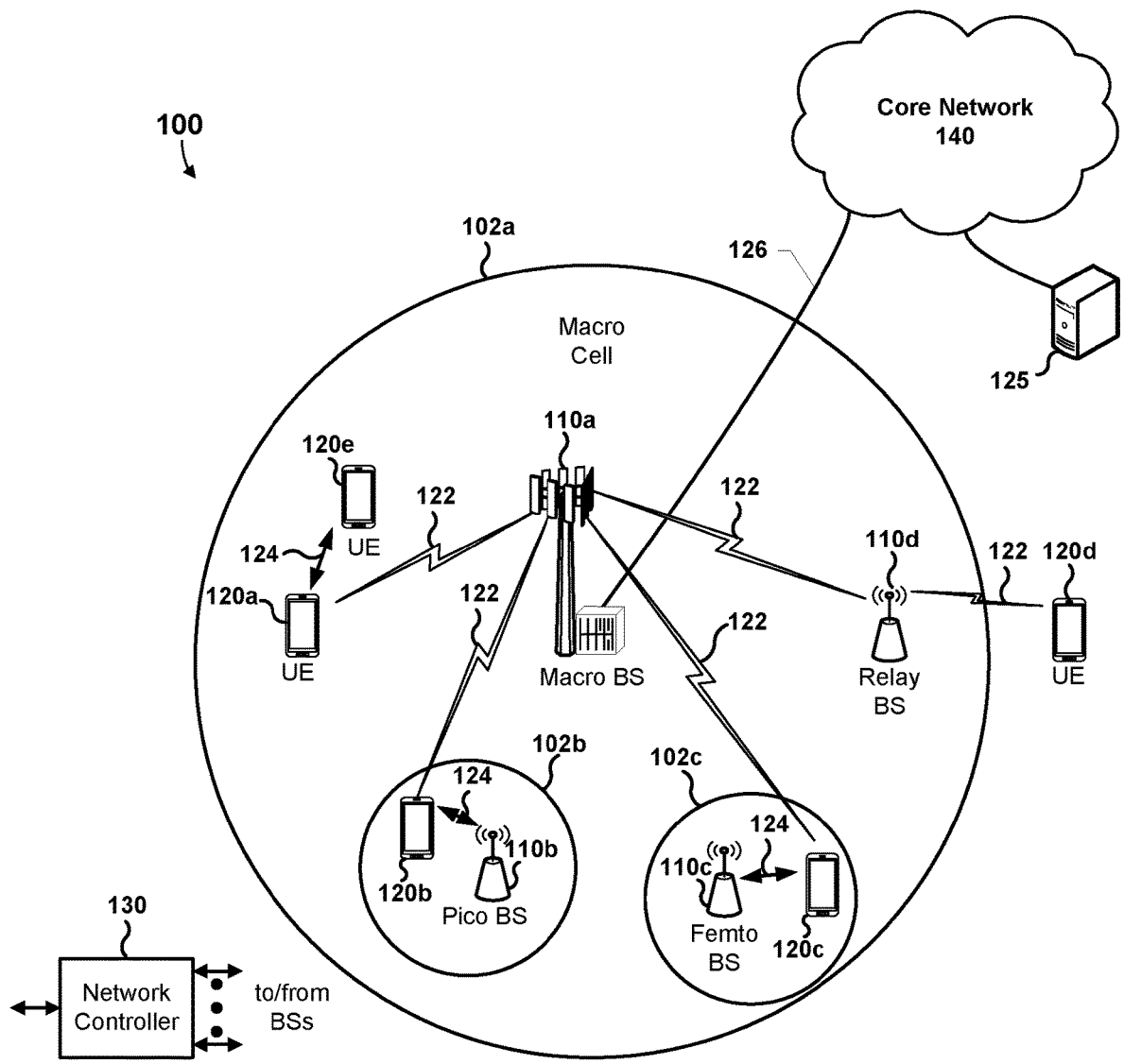
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for managing the offloading of computing tasks for remote processing of data for a service or application of a wireless device. The wireless device may offload a resource-intensive computing task to a processing device in a communication network, such as a server device. Various embodiments enable managing the timing of the performance of the computing task within a latency budget to account for latency incurred by the time required to perform remote processing and information travel time over communication links.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Some computing tasks place high demands on the relatively limited processing capabilities of modern wireless devices. For example, computing tasks related to virtual reality (VR), augmented reality (AR), or mixed reality (MR) applications (sometimes referred to collectively as extended reality (XR)) involve receiving sensor data, processing the sensor data, and generating images to be presented on a display device (such as a head-mounted display device) in real time. The user experience related to such presentations is highly latency sensitive. Similarly, many computing tasks required for autonomous and semi-autonomous vehicles such as sensing the vehicle's environment, processing sensor data, and making maneuvering and navigation decisions are safety-critical and thus also are latency sensitive. Further, remote robotic operations, such as remote surgery and other telemedicine operations, are also critically dependent on processing latency. These and other similar applications have strict low latency requirements in that they require latency to be below a threshold to provide minimum acceptable performance.

Network computing devices, such as server devices, may provide computing support to wireless device, enabling a wireless device to offload processing-intensive computing tasks to the network computing device leveraging, for example, a high-speed communication network such as 5G New Radio (NR) communication systems. Such systems require the management of latency incurred by the time required to perform remote processing and data travel time over any communication links.

However, conventional static solutions to complex processing challenges are unacceptable or inefficient. For example, running a wireless device processor at a relatively high operational frequency may meet an application's latency requirement, but may push the processor to or beyond acceptable thermal limits as well as consume power at a rate that will drain a battery in a short amount of time. Further, latency over a communication network may be stochastic, making manual tuning of a wireless device's processor speed to address variations in network latency functionally impossible.

Various embodiments include methods for processing data using computing resources of a remote network computing device including dynamically tracking latency in the performance of a computing task relative to a latency budget for the computing task. As used herein, the term "latency budget" refers to the time during which a computing task must be completed to satisfy a performance threshold or quality threshold of the computing task. Remote processing of data for a computing task may involve several operations each involving an amount of time, such as initial processing of data by a wireless device, time for transmission of data from the wireless device to a remote network computing device, processing time by the remote network computing device, time for transmission of data from the remote network computing device to the wireless device, and further processing time by the wireless device to use the data received from the remote network computing device. The time required to complete all of the operations involved in delegating a computing task to a remote computing resource is referred to herein as the "round-trip latency" of the computing task. In various embodiments, the wireless device and the remote network computing device determine and report time consumed by one or more of the remote processing operations, so that the next device (e.g., the wireless device or the remote network computing device) may adjust a processing time for processing data for the delegated computing task.

Various embodiments may include methods performed by a processor of a wireless device for processing data using computing resources of a remote network computing device. Some embodiments may include determining factors affecting a round-trip latency of a computing task that may be delegated to a remote network computing device, generating first metadata including the determined factors and a latency budget for the computing task, sending the first metadata and data to the remote network computing device for processing as part of the computing task, receiving from the network computing device processed data of the computing task and second metadata including an indication of a remaining time in the latency budget, and adjusting a processing time for receiving and/or post-processing the processed data based on the second metadata to complete the overall computing task within the latency budget.

Various embodiments may include methods performed by a process of a network computing device for processing data in support of a remote wireless device (i.e., remote from the network computing device). In some embodiments, the network computing device may receive first metadata and data for processing as part of a computing task from a remote wireless device. The first metadata may include factors affecting a round-trip latency and a latency budget for the computing task. The network computing device may adjust a processing time for processing the data based on the first metadata and the latency budget, and may generate second metadata including an indication of a remaining time in the latency budget. The network computing device may send processed data and the second metadata to the remote wireless device in a format that enables post-processing and use by the remote wireless device to complete a computing task.

In some embodiments, the wireless device or the network computing device may adjust the processing time by adjusting one or more of an operating frequency of one or more processors (such as a CPU, GPU, DSP, or another suitable processor) and/or a transfer rate of memory components (such as double data rate (DDR) memory) that may affect a processor's processing capability. In some embodiments, the wireless device or the network computing device may adjust the processing time by adjusting a dynamic clock and voltage scaling (DCVS) of a processor and a dynamic task priority assignment of data to be processed based on a time remaining in the latency budget. In some embodiments, the wireless device or the network computing device may adjust a processing time by adjusting the DCVS and a position of the data to be processed in a processing queue or task queue (a "task queue position"), or changing an order in which the data is to be processed (a processing order or sequence) based on the time remaining in the latency budget. In some embodiments, the wireless device may adjust the processing time by adjusting a level of detail in a computed output, such as a rendering quality of images for presentation as part of an XR application. In some embodiments, the wireless device may adjust the processing time by selecting an appropriate algorithm for a computing task, such as a relatively complex or sophisticated algorithm (e.g., an algorithm that performs relatively many determinations or computations or performs operations using a relatively large number of factors or criteria), or a relatively simple or light algorithm (e.g., an algorithm that performs relatively fewer determinations or computations or performs operations using a relatively smaller number of factors or criteria).

In some embodiments, the wireless device may receive data from the network computing device that has been processed by the network computing device, but is not usable as received by the wireless device without additional processing by the wireless device (i.e., the data received from the wireless device is not a completed work product). In some embodiments, the wireless device or the network computing device may adjust a compression ratio of data for transmission to the other device based on the determined factors and the latency budget. For example, the wireless device or the network computing device may adjust a data compression ratio (e.g., by selecting a different data compression algorithm) to increase or decrease a size of data portions (e.g., segments) based on a level of communication link congestion and/or one or more communication link conditions, such as signal noise, interference, throughput, bandwidth, or another suitable communication link condition.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of wireless devices (illustrated as wireless device 120a-120e in FIG. 1). The communications system 100 may also include one or more network computing devices 125 that may communicate with the wireless devices 120a-120e. In some embodiments, the wireless device 120a-120e may send data to the network computing device(s) 125 for processing as part of a computing task.

The communications system 100 may also include a number of base stations (illustrated as the BS 110a, the BS 110b, the BS 110c, and the BS 110d) and other network entities. A base station is an entity that communicates with wireless devices, and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with a service subscription. A pico cell may cover a relatively small geographic area and may allow unrestricted access by wireless devices with a service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a wireless device) and transmit the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplexing (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
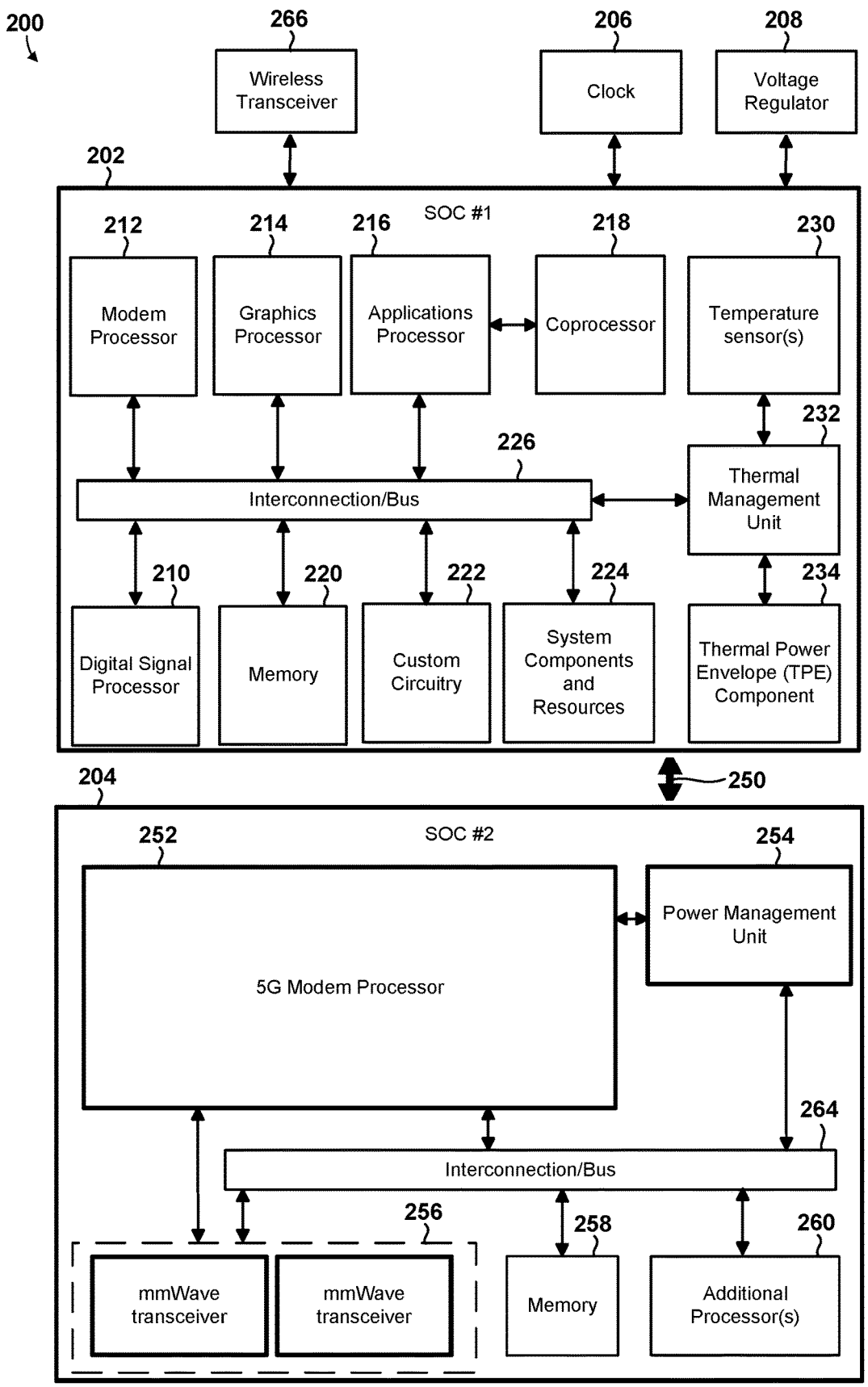
FIG. 2 is a component block diagram illustrating an example computing and wireless modem system suitable for implementing any of the various embodiments.

In some embodiments, two or more wireless devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
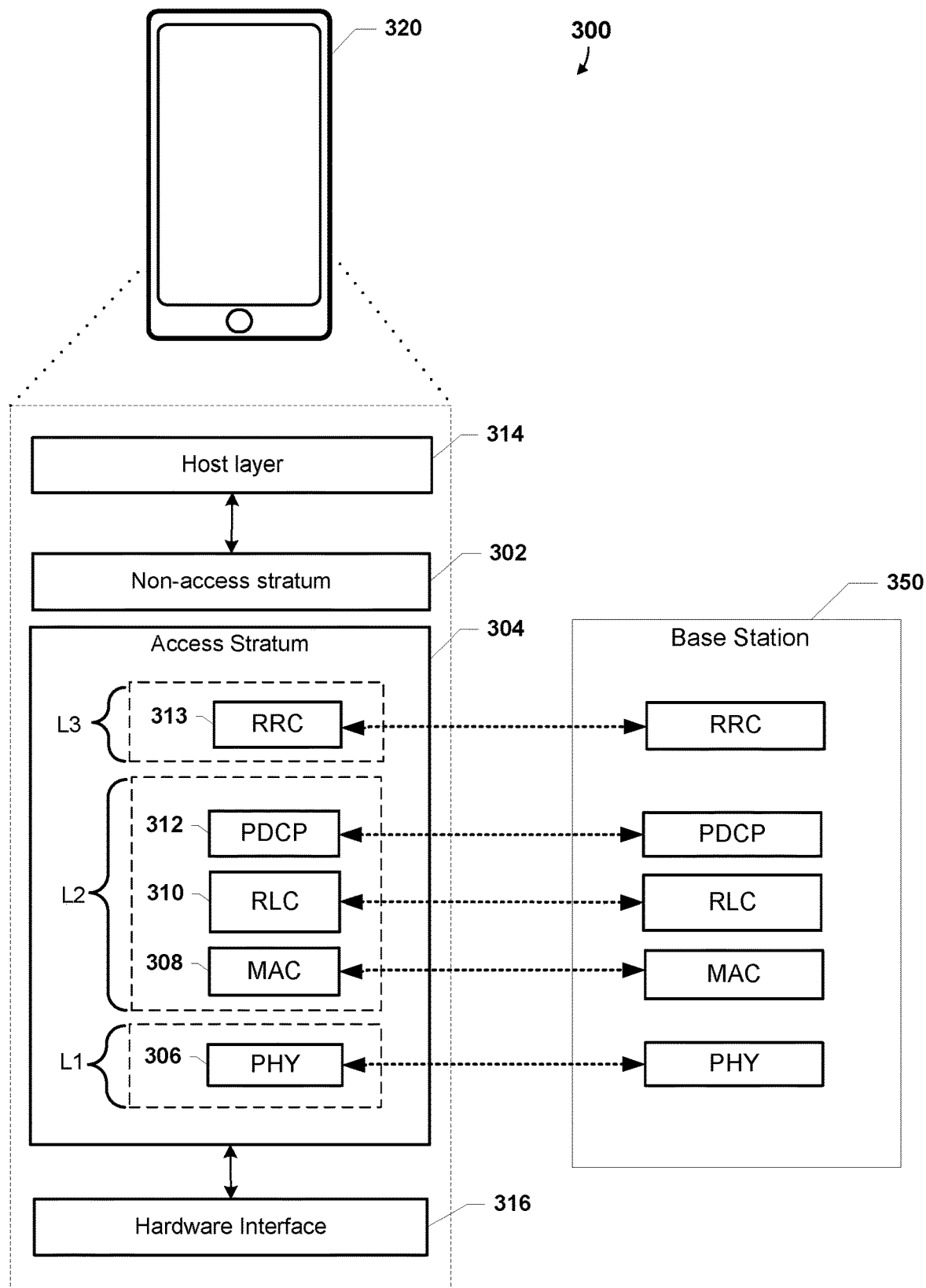
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
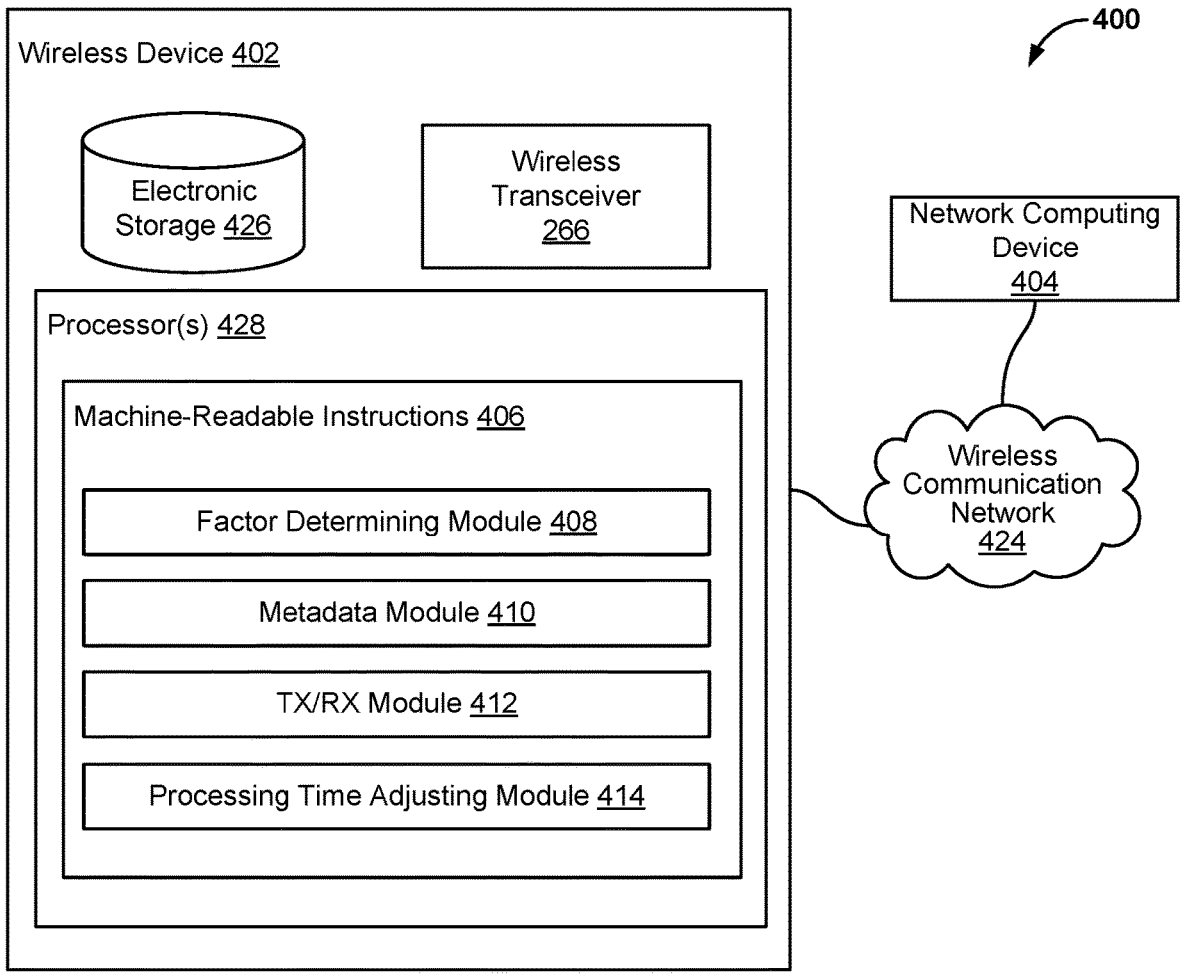
FIGS. 4A and 4B are component block diagrams illustrating systems configured for managing information transmission for wireless communications performed by a processor of a base station in accordance with various embodiments.
Figure 4B:
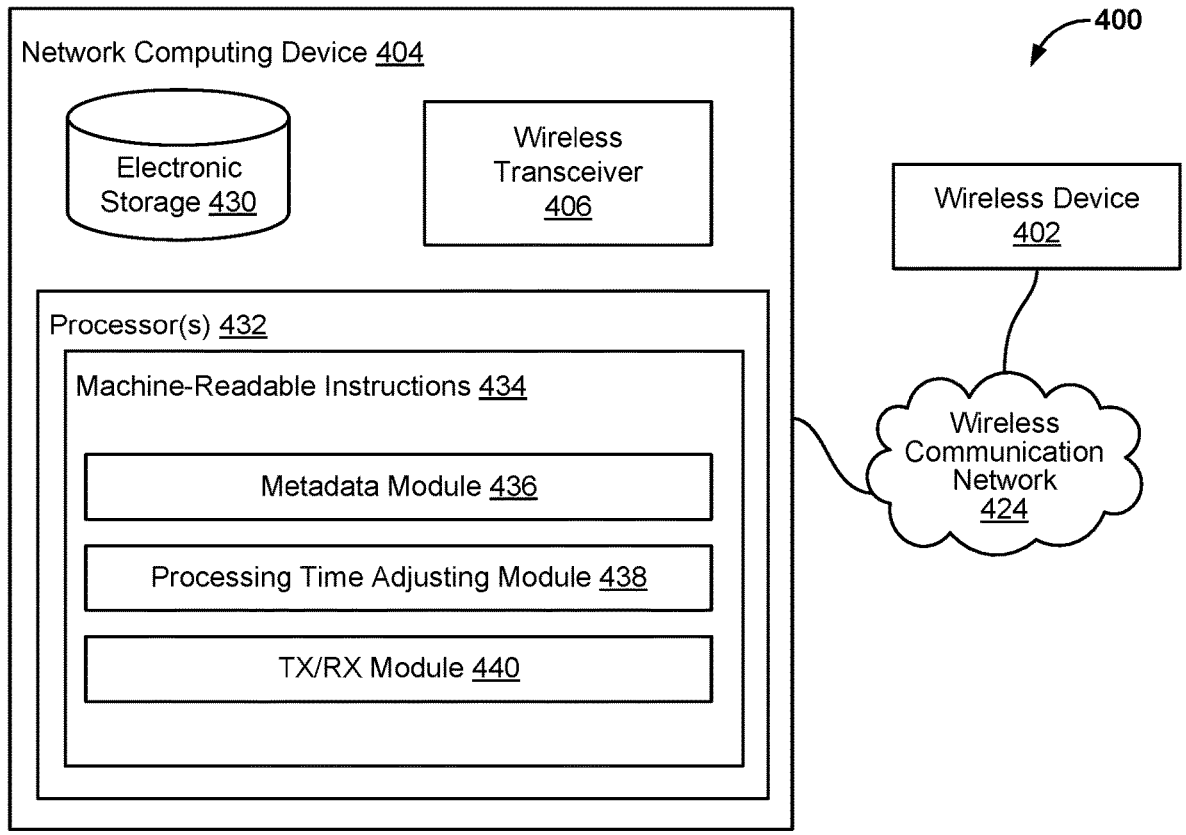

FIGS. 4A and 4B are component block diagrams illustrating a system 400 configured for processing data using computing resources of a remote network computing device in accordance with various embodiments. With reference to FIGS. 1-4B, the system 400 may include a wireless device 402 (e.g., 120a-120e, 200, 320) and a network computing device 404 (e.g., 120a-120e, 200, 320). The wireless device 402 and the network computing device 404 may communicate over a wireless communication network 424 (aspects of which are illustrated in FIG. 1).

Referring to FIG. 4A, the wireless device 402 may include one or more processors 428 coupled to electronic storage 426 and a wireless transceiver (e.g., 266). The wireless transceiver 266 may be configured to receive messages to be sent in uplink transmissions from the processor(s) 428, and to transmit such messages via an antenna (not shown) to a wireless communication network 424 for relay to the network computing device 404. Similarly, the wireless transceiver 266 may be configured to receive messages from the network computing device 404 in downlink transmissions from the wireless communication network 424 and pass the messages (e.g., via a modem (e.g., 252) that demodulates the messages) to the one or more processors 428.

The processor(s) 428 may be configured by machine-readable instructions 406. Machine-readable instructions 406 may include one or more instruction modules. The instruction modules may include computer program modules. The instruction modules may include one or more of a factor determining module 408, a metadata module 410, a transmission and reception (TX/RX) module 412, a processing time adjusting module 414, or other instruction modules.

The factor determining module 408 may be configured to determine factors affecting a round-trip latency of a computing task.

The metadata module 410 may be configured to generate second metadata including the determined factors and a latency budget for the computing task.

The TX/RX module 412 may be configured to send and receive messages, for example, to and from the network computing device 404. The TX/RX module 412 may be configured to send metadata and data to the remote network computing device 404 for processing as part of the computing task. The TX/RX module 412 may be configured to receive from the remote network computing device 404 processed data of the computing task and second metadata including an indication of a remaining time in the latency budget.

The processing time adjusting module 414 may be configured to adjust a processing time for post-processing the processed data based on the second metadata to complete the post-processing of the processed data within the latency budget.

Referring to FIG. 4B, the network computing device 404 may include one or more processors 432 coupled to electronic storage 430 and a wireless transceiver 406. The wireless transceiver 406 may be configured to receive messages to be sent in uplink transmissions from the processor(s) 432, and to transmit such messages via an antenna (not shown) to a wireless communication network 424 for relay to the wireless device 402. Similarly, the wireless transceiver 406 may be configured to receive messages from the wireless device 402 in downlink transmissions from the wireless communication network 424 and pass the messages (e.g., via a modem (e.g., 252) that demodulates the messages) to the one or more processors 432.

The processor(s) 432 may be configured by machine-readable instructions 434. Machine-readable instructions 406 may include one or more instruction modules. The instruction modules may include computer program modules. The instruction modules may include one or more of a metadata module 436, a processing time adjusting module 438, a TX/RX module 440, or other instruction modules.

The metadata module 436 may be configured to receive first metadata and data for processing as part of a computing task from a remote wireless device, the first metadata including factors affecting a round-trip latency and a latency budget for the computing task. The metadata module 436 may be configured to generate second metadata including an indication of a remaining time in the latency budget.

The processing time adjusting module 438 may be configured to adjust a processing time for processing the data based on the metadata and the latency budget.

The TX/RX module 440 may be configured to send and receive messages, for example, to and from the wireless device 402. The TX/RX module 440 may be configured to send processed data and the second metadata to the remote wireless device in a format that enables post-processing by the remote wireless device.

In some embodiments, the wireless device 402 and the network computing device 404 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which the wireless device 402 and the network computing device 404 may be operatively linked via some other communication media.

The electronic storage 426, 430 may include non-transitory storage media that electronically stores information. The electronic storage media of electronic storage 426, 430 may include one or both of system storage that is provided integrally (i.e., substantially non-removable) with the wireless device 402 or the network computing device 404 and/or removable storage that is removably connectable to the wireless device 402 or the network computing device 404 via, for example, a port (e.g., a universal serial bus (USB)

port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the wireless device 402 or the network computing device 404, or other information that enables the wireless device 402 or the network computing device 404 to function as described herein.

Processor(s) 428, 432 may be configured to provide information processing capabilities in the wireless device 402 and the network computing device 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-414 and modules 436-440 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 and modules 436-440 described below is for illustrative purposes, and is not intended to be limiting, as any of modules 408-414 and modules 436-440 may provide more or less functionality than is described. For example, one or more of the modules 408-414 and modules 436-440 may be eliminated, and some or all of its functionality may be provided by other modules 408-414 and modules 436-440. As another example, the processor(s) 428, 432 may be configured to execute one or more additional modules that may perform some or all of the functionality attributed below to one of the modules 408-414 and modules 436-440.

Figure 5A:
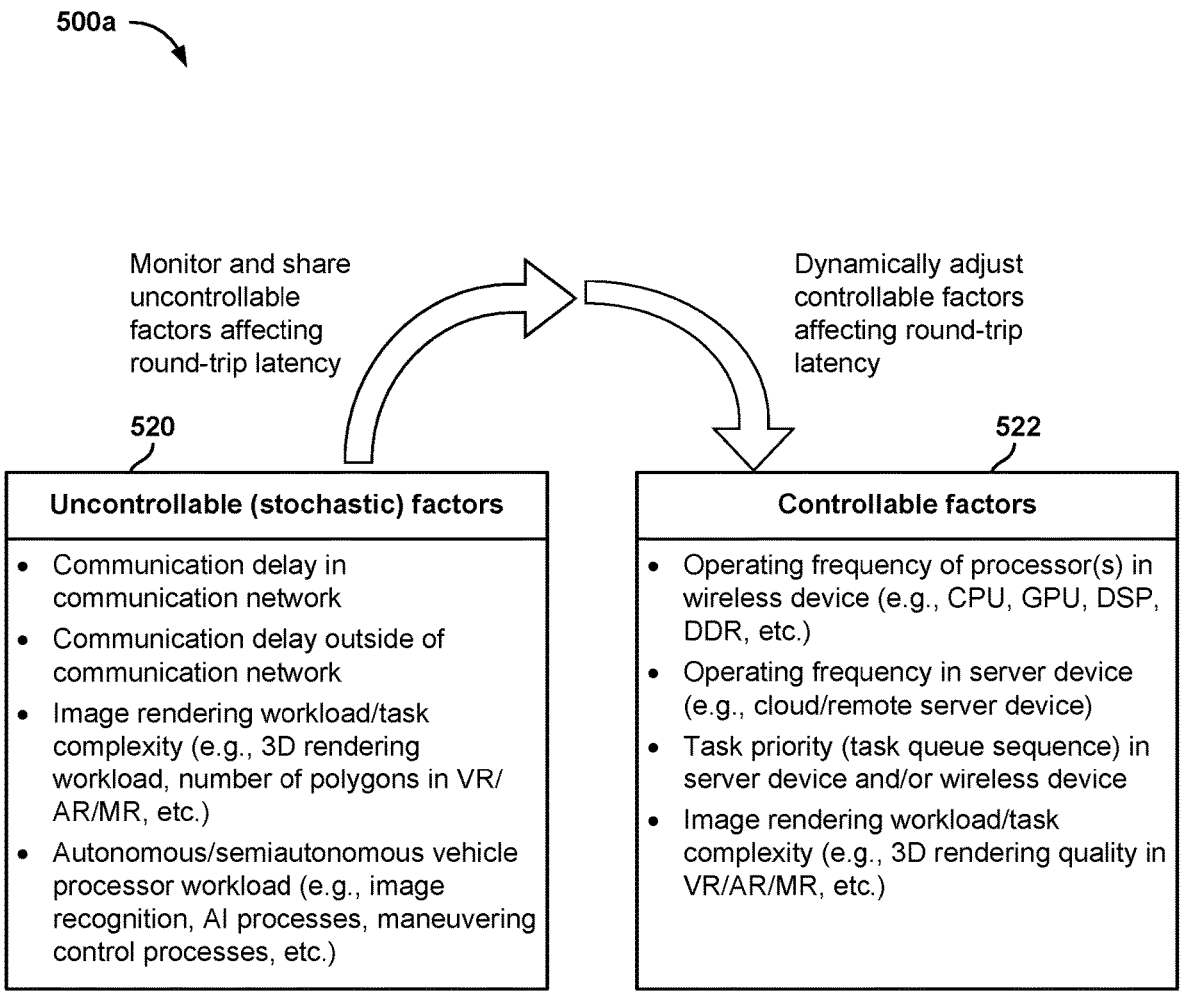
FIG. 5A is a notional diagram illustrating factors affecting overall latency.

FIG. 5A is a notional diagram illustrating factors 500a affecting round-trip latency. With reference to FIGS. 1-5A, the factors 500a may be monitored and/or adjusted by a processor of a wireless device (e.g., 120a-120e, 200, 320, 402) and/or a processor of a network computing device (e.g., 126, 200, 404). As mentioned above, certain aspects of the performance of a computing task may be stochastic and thus difficult or impractical to adjust or control. In some embodiments, a processor of the wireless device and/or a network computing device may monitor one or more stochastic factors 520, for example, a communication delay in the communication network, a communication delay outside of the communication network (e.g., intranets, the Internet, etc.) a complexity of an image rendering workload or task (for example, a 3D rendering workload, or a number of polygons in an XR task), and/or a workload of processor in an autonomous or semiautonomous vehicle. Examples of processor workloads impacted by to stochastic factors may include performing a task such as image or object recognition, one or more artificial intelligence (AI) processes, maneuvering control processes, and other similar processes. In some embodiments, the processor of the wireless device and/or a network computing device may communicate the monitored stochastic factors to another computing device (i.e., from the wireless device to the network computing device, or vice versa).

In some embodiments, the processor of the wireless device and/or the network computing device may dynamically adjust one or more controllable factors 522 based at least in part on the stochastic factors 520. Examples of controllable factors 520 include an operating frequency of one or more processors (such as a CPU, GPU, DSP, or another suitable processor) and/or a transfer rate of memory components, such as DDR memory that may affect a processor's processing capability.

Figure 5B:
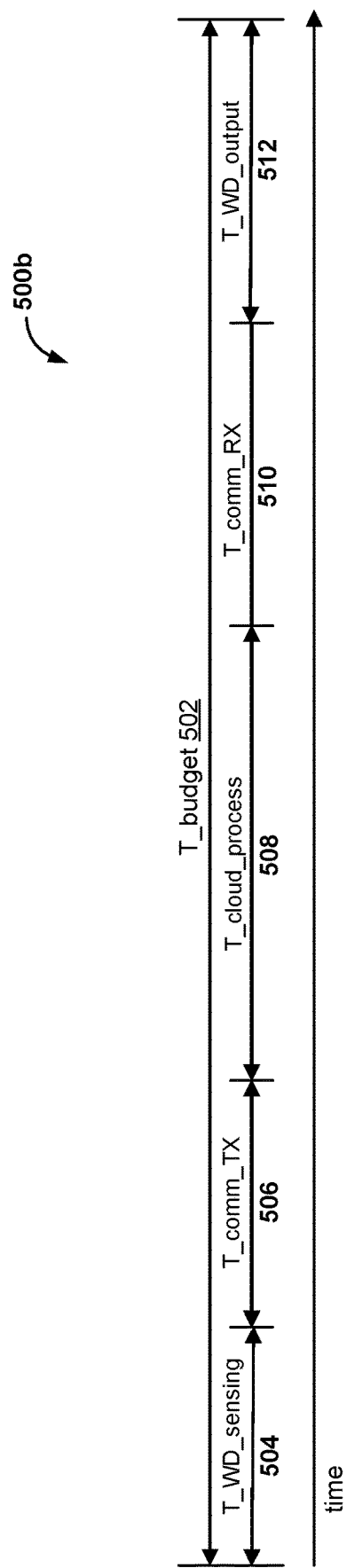
FIG. 5B is a timeline illustrating a latency budget model according to various embodiments.

FIG. 5B is a timeline illustrating a latency budget model 500b according to various embodiments. With reference to FIGS. 1-5B, the latency budget model 500b may be used by a processor of a wireless device (e.g., 120a-120e, 200, 320, 402) and/or a processor of a network computing device (e.g., 126, 200, 404). The budget model may include a latency budget 502 (which may be represented as T_budget) that indicates a maximum latency for a computing task. The latency budget may include various factors that affect a round-trip latency of a computing task. In various embodiments, factors affecting a round-trip latency of a computing task may include a wireless device pre-processing time 504, a first communication time from the wireless device to the remote network computing device 506, a remote network computing device processing time 508, a second communication time from the remote network computing device to the wireless device 510, and a wireless device post-processing time 512. In various embodiments, the latency budget model 500b may include one or more aspects of the factors 500a affecting round-trip latency (FIG. 5A), including stochastic factors 520 and controllable factors 522.

In some embodiments, the wireless device pre-processing time 504 (which may be represented as T_WD_sensing) may include a time for the wireless device processor to receive data from a sensor, perform some amount of processing of the received data, and/or prepare the data for transmission to the network computing device. The wireless device pre-processing time 504 may vary based on, for example, a complexity of sensor data, an amount of sensor data, processing capabilities of the wireless device, and other factors.

In some embodiments, the first communication time from the wireless device to the remote network computing device 506 (which may be represented as T_comm_TX) may include a time required the data sent by the wireless device to be conveyed by the communication system to the network computing device. The first communication time 506 may vary based on, for example, network congestion, one or more communication link conditions (such as signal noise, interference, throughput, bandwidth, or another suitable communication link condition).

In some embodiments, the remote network computing device processing time 508 (which may be represented as T_cloud_process) may include a time for the processor of the network computing device to receive, perform processing on, and/or prepare the processed data for transmission to the wireless device. The remote network computing device processing time 508 may vary based on, for example, a complexity of sensor data, an amount of sensor data, processing capabilities of the wireless device, and other factors. The remote network computing device processing time 508 also may vary based on a compression ratio of the data received from the wireless device.

The second communication time from the remote network computing device to the wireless device 510 (which may be represented as T_comm_RX) may include a time required the processed data sent by the network computing device to be conveyed by the communication system to the wireless device. The second communication time 510 may vary based on, for example, network congestion, one or more communication link conditions (such as signal noise, interference, throughput, bandwidth, or another suitable communication link condition).

The wireless device post-processing time 512 (which may be represented as T_WD_output) may include a time required for the processor of the wireless device to receive the processed data from the network computing device, decompress the data received from the network computing device (e.g., based on the compression ratio of the processed data), perform post-processing on the received data, to present the post-processed data (e.g., via an output device of the wireless device), and other factors.

Figure 6:
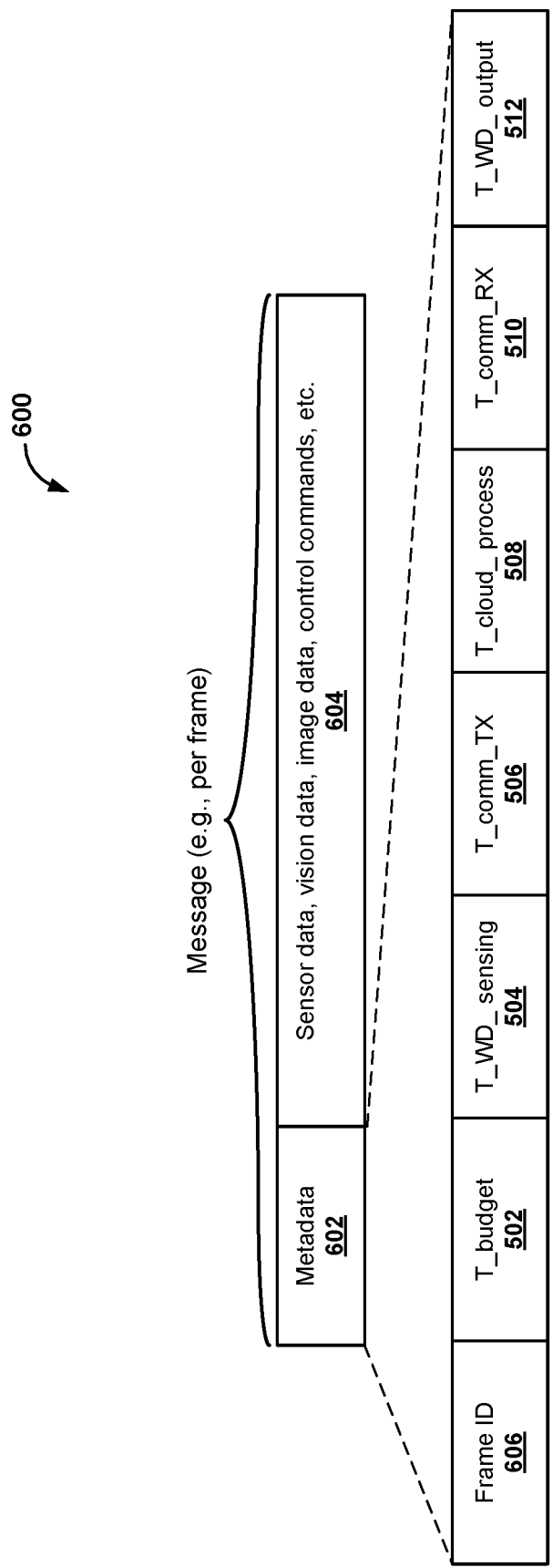
FIG. 6 is a block diagram illustrating a message according to various embodiments.

FIG. 6 is a block diagram illustrating a message 600 according to various embodiments. With reference to FIGS. 1-6, the message 600 may be generated and sent by a processor of a wireless device (e.g., 120a-120e, 200, 320, 402) and/or a processor of a network computing device (e.g., 125, 320, 404).

The message 600 may be sent from the wireless device and/or the network computing device from time to time, for example, once per data transmission frame. In some embodiments, the message 600 may include metadata 602 and data 604 related to the computing task, such as sensor data, image data, control commands, vision data (i.e., data related to an XR application such as pose data, image data, virtual images or text, and the like) and other suitable data related to the computing task. In some embodiments, the metadata 602 may include a Frame ID 606 to indicate an association with a particular data frame, the latency budget 502, and factors affecting the round-trip latency of the computing task including the wireless device pre-processing time 504, the first communication time from the wireless device to the remote network computing device 506, the remote network computing device processing time 508, the second communication time from the remote network computing device to the wireless device 510, and the wireless device post-processing time 512.

Figure 7:
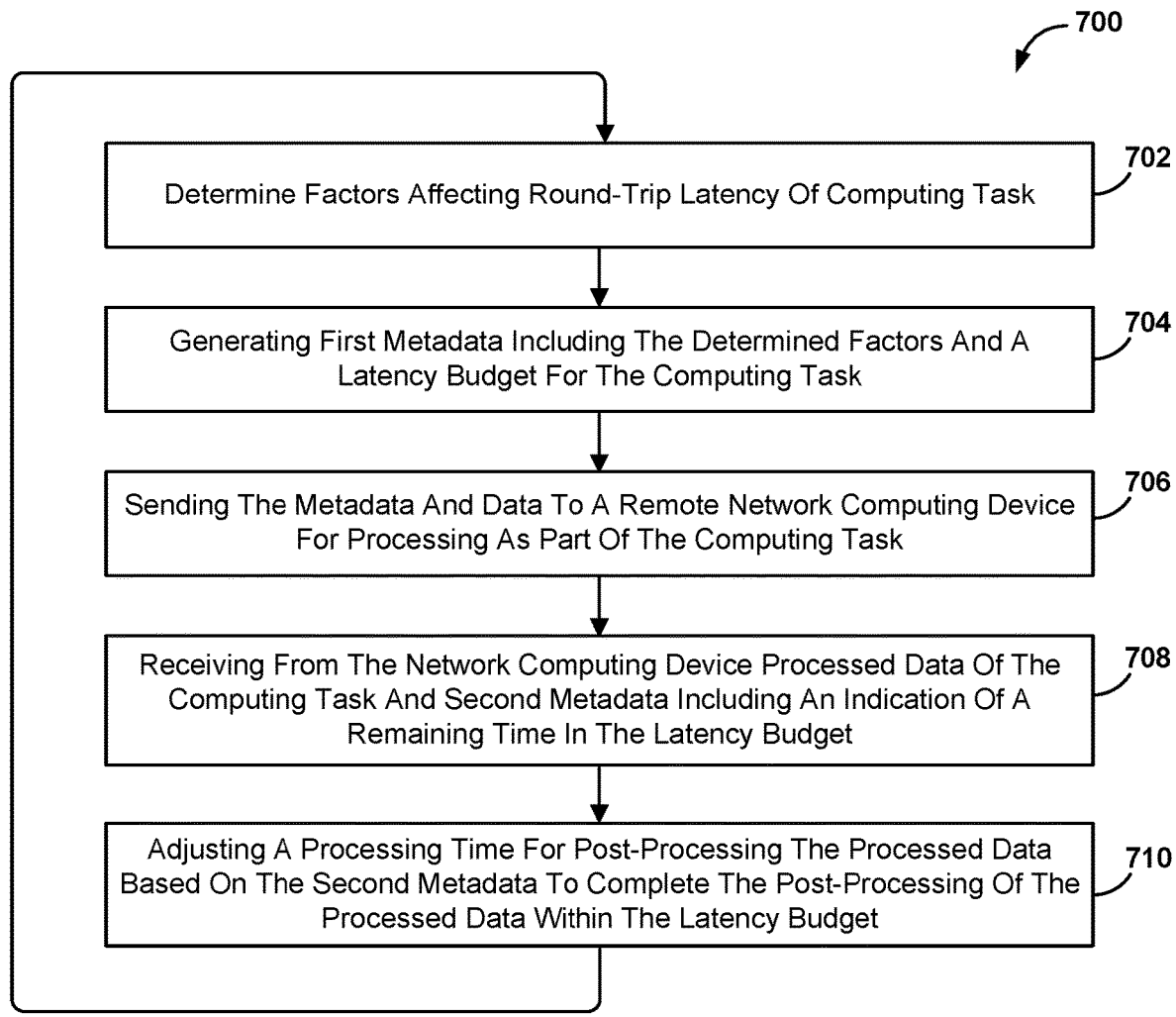
FIG. 7 is a process flow diagram illustrating a method 700 that may be performed by a processor of a wireless device for processing data using computing resources of a remote network computing device according to various embodiments.

FIG. 7 is a process flow diagram illustrating a method 700 that may be performed by a processor of a wireless device for processing data using computing resources of a remote network computing device according to various embodiments. With reference to FIGS. 1-7, the method 700 may be implemented by a processor (e.g., 210, 212, 214, 216, 218, 252, 260, 428) of a wireless device (e.g., 120a-120e, 200, 320, 402).

In block 702, the processor may determine factors affecting a round-trip latency of a computing task. In some embodiments, the factors affecting a round-trip latency of a computing task may include a wireless device pre-processing time 504, a first communication time from the wireless device to the remote network computing device 506, a remote network computing device processing time 508, a second communication time from the remote network computing device to the wireless device 510, and a wireless device post-processing time 512 (FIG. 5). Means for performing functions of the operations in block 702 may include the processor (e.g., 210, 212, 214, 216, 218, 252, 260, 428).

In block 704, the processor may generate first metadata including the determined factors and a latency budget for the computing task. For example, the processor may generate the first metadata 602 (FIG. 6). Means for performing functions of the operations in block 704 may include the processor (e.g., 210, 212, 214, 216, 218, 252, 260, 428).

In block 706, the processor may send the first metadata and data to a remote network computing device for processing as part of the computing task. For example, the processor may send the message 600 (FIG. 6) to the remote network computing device. Means for performing functions of the operations in block 706 may include the processor (e.g., 210, 212, 214, 216, 218, 252, 260, 432) coupled to a wireless transceiver (e.g., 266).

In block 708, the processor may receive from the network computing device processed data of the computing task and second metadata including an indication of a remaining time in the latency budget. In some embodiments, the wireless device may receive from the remote network computing device a message similar to the message 600 (FIG. 6). In some embodiments, the wireless device may receive data from the network computing device that has been processed by the network computing device, but is not usable as received by the wireless device without additional processing by the wireless device (i.e., the data received from the wireless device is not a completed work product). Means for performing functions of the operations in block 706 may include the processor (e.g., 210, 212, 214, 216, 218, 252, 260, 432) coupled to a wireless transceiver (e.g., 266).

In block 710 the processor may adjust a processing time for post-processing the processed data based on the second metadata to complete the post-processing of the processed data within the latency budget. In some embodiments, the processor may dynamically adjust one or more of an operating frequency of one or more processors (such as a CPU, GPU, DSP, or another suitable processor) and/or a transfer rate of memory components, such as DDR memory, that may affect a processor's processing capability. Means for performing functions of the operations in block 706 may include the processor (e.g., 210, 212, 214, 216, 218, 252, 260, 432).

The processor may again perform the operations of blocks 702-710 from time to time. In this manner, the wireless device may dynamically track latency of the performance of the computing task relative to the latency budget for the computing task and dynamically adjust the timing of performance of the computing task to meet the latency budget.

Figure 8:
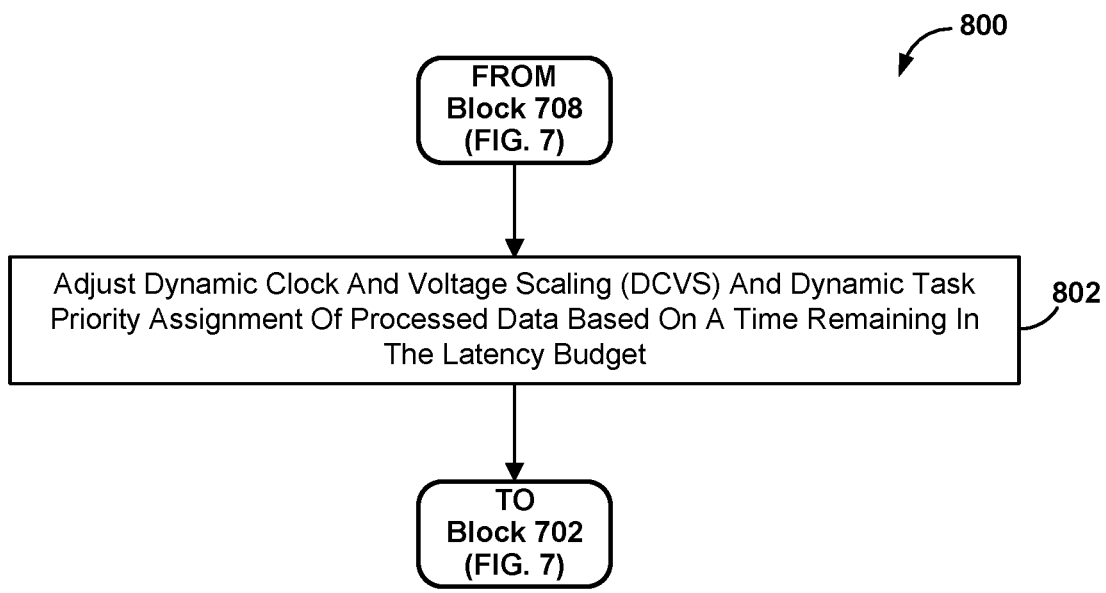
FIGS. 8-10 are process flow diagrams illustrating operations that may be performed by a processor of a wireless device as part of a method for processing data using computing resources of a remote network computing device according to various embodiments.
Figure 9:
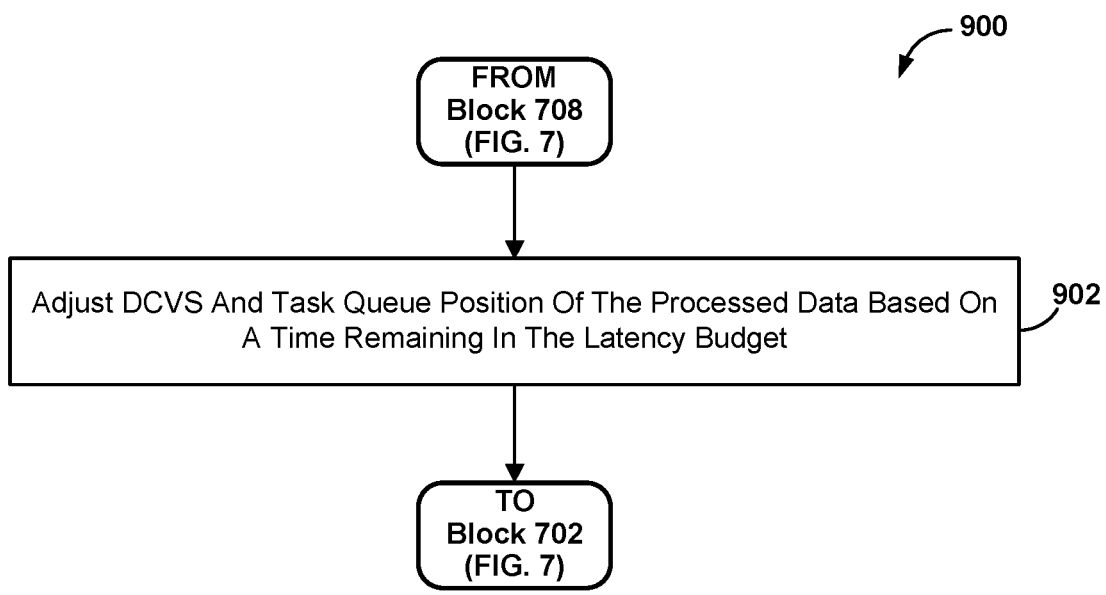
Figure 10:
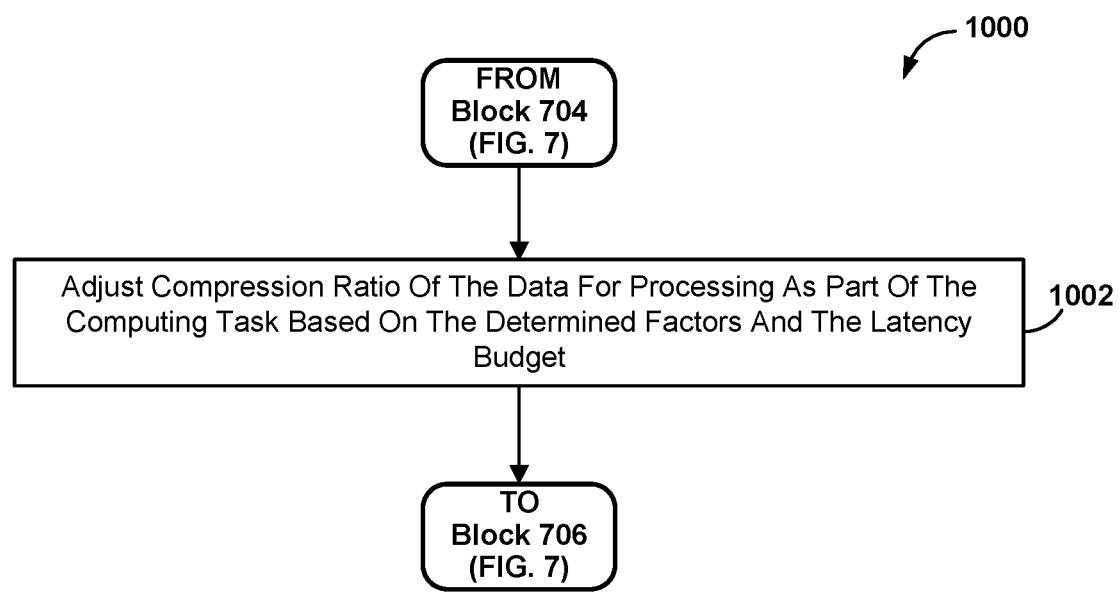

FIGS. 8-10 are process flow diagrams illustrating operations 800-1000 that may be performed by a processor of a wireless device as part of a method for processing data using computing resources of a remote network computing device according to various embodiments. With reference to FIGS. 1-10, the operations 800, 900, 1000 may be implemented by a processor (e.g., 210, 212, 214, 216, 218, 252, 260, 428) of a wireless device (e.g., 120a-120e, 200, 320, 402).

With reference to FIG. 8, following the operations of block 708 of the method 700, the processor may adjust a dynamic clock and voltage scaling (DCVS) and a dynamic task priority assignment of the processed data based on a time remaining in the latency budget in block 802. In some embodiments, a relatively higher task priority may cause the processor to process the processed data before data that is assigned a lower priority. Means for performing functions of the operations in block 802 may include the processor (e.g., 210, 212, 214, 216, 218, 252, 260, 432).

The processor may then perform the operations of block 702 of the method 700 as described.

With reference to FIG. 9, following the operations of block 708 of the method 700, the processor may adjust a DCVS and a task queue position of the processed data based on a time remaining in the latency budget in block 902. In some embodiments, a task queue position may affect a time at which the processor processes the processed data relative to other data for processing in the task queue. Means for performing functions of the operations in block 902 may include the processor (e.g., 210, 212, 214, 216, 218, 252, 260, 432).

The processor may then perform the operations of block 702 of the method 700 as described.

With reference to FIG. 10, following the operations of block 704 of the method 700, the processor may adjust a compression ratio of the data for processing as part of the computing task based on the determined factors and the latency budget in block 1002. Means for performing functions of the operations in block 1002 may include the processor (e.g., 210, 212, 214, 216, 218, 252, 260, 432).

The processor may then perform the operations of block 706 of the method 700 as described.

Figure 11:
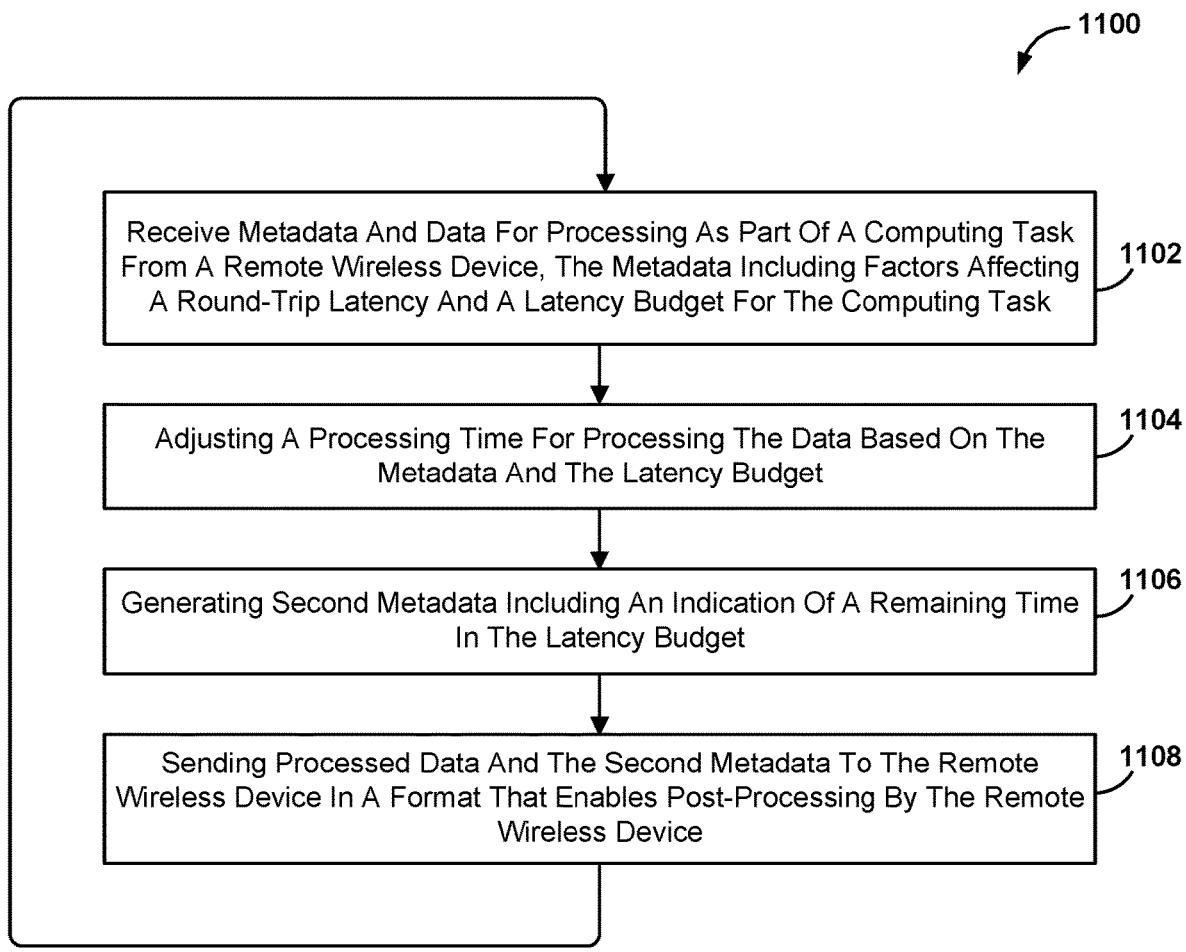
FIG. 11 is a process flow diagram illustrating a method that may be performed by a processor of a network computing device for processing data in support of a remote wireless device in accordance with various embodiments.

FIG. 11 is a process flow diagram illustrating a method 1100 that may be performed by a processor of a network computing device for processing data in support of a remote wireless device according to various embodiments. With reference to FIGS. 1-11, the method 1100 may be implemented by a processor (e.g., 210, 212, 214, 216, 218, 252, 260, 428) of a network computing device (e.g., 200, 125, 404).

In block 1102, the processor may receive first metadata and data for processing as part of a computing task from a remote wireless device, the first metadata including factors affecting a round-trip latency and a latency budget for the computing task. For example, the processor may receive a message similar to the message 600 (FIG. 6). In some embodiments, the factors affecting a round-trip latency of a computing task may include a wireless device pre-processing time 504, a first communication time from the wireless device to the remote network computing device 506, a remote network computing device processing time 508, a second communication time from the remote network computing device to the wireless device 510, and a wireless device post-processing time 512 (FIG. 5). Means for performing functions of the operations in block 1102 may include the processor (e.g., 210, 212, 214, 216, 218, 252, 260, 432) coupled to a wireless transceiver (e.g., 406).

In block 1104, the processor may adjust a processing time for processing the data based on the first metadata and the latency budget. Means for performing functions of the operations in block 706 may include the processor (e.g., 210, 212, 214, 216, 218, 252, 260, 432).

In block 1106, the processor may generate second metadata including an indication of a remaining time in the latency budget. Means for performing functions of the operations in block 706 may include the processor (e.g., 210, 212, 214, 216, 218, 252, 260, 432).

In block 1108, the processor may send processed data and the second metadata to the remote wireless device in a format that enables post-processing by the remote wireless device. Means for performing functions of the operations in block 706 may include the processor (e.g., 210, 212, 214, 216, 218, 252, 260, 432) coupled to a wireless transceiver (e.g., 406).

The processor may again perform the operations of blocks 1102-1108 from time to time. In this manner, the network computing device may dynamically track latency of the performance of the computing task relative to the latency budget for the computing task and dynamically adjust the timing of performance of the computing task to meet the latency budget.

Figure 12:
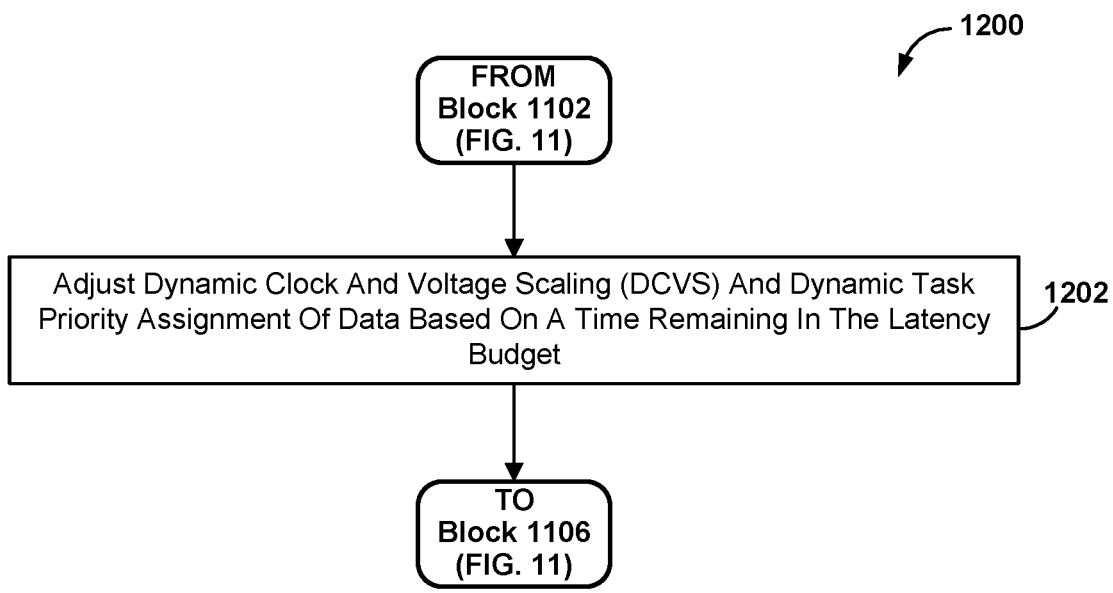
FIGS. 12-14 are process flow diagrams illustrating operations that may be performed by a processor of network computing device as part of a method for processing data in support of a remote wireless device in accordance with various embodiments.
Figure 13:
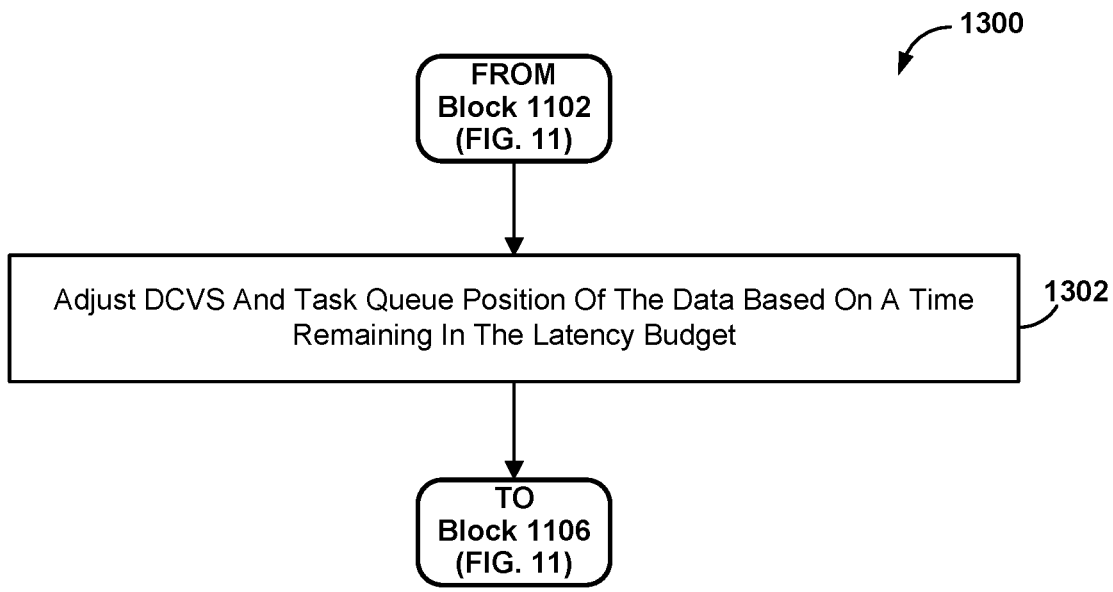
Figure 14:
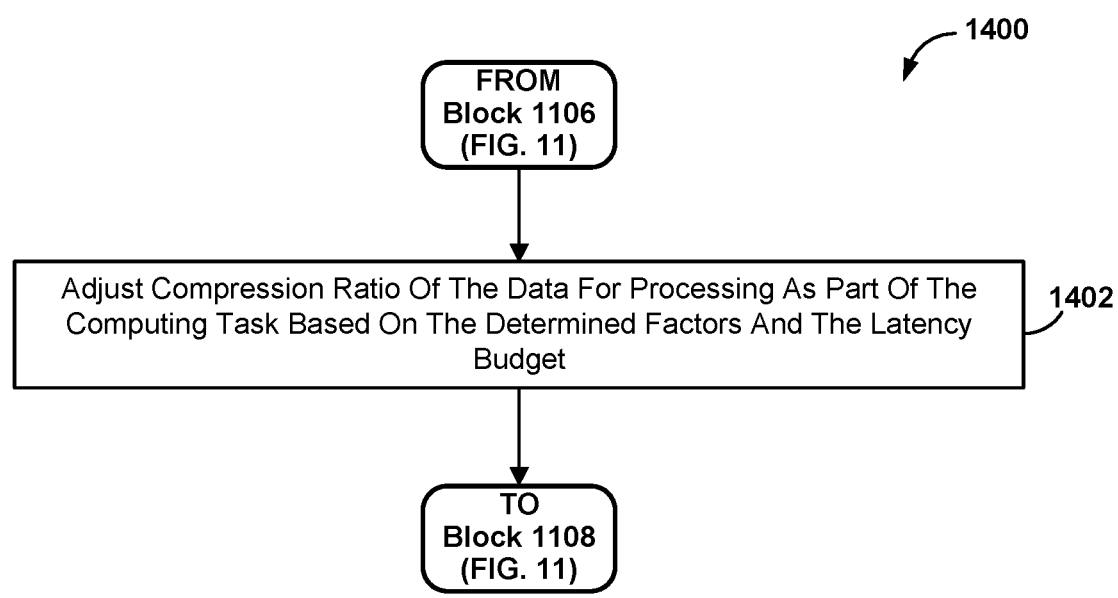

FIGS. 12-14 are process flow diagrams illustrating operations 1200, 1300, 1400 that may be performed by a processor of a wireless device as part of a method for processing data using computing resources of a remote network computing device according to various embodiments. With reference to FIGS. 1-14, the operations 1200, 1300, 1400 may be implemented by a processor (e.g., 210, 212, 214, 216, 218, 252, 260, 428) of a network computing device (e.g., 125, 320, 404).

With reference to FIG. 12, following the operations of block 1102 of the method 1100, the processor may adjust a dynamic clock and voltage scaling (DCVS) and a dynamic task priority of the data based on a time remaining in the latency budget in block 1202. Means for performing functions of the operations in block 802 may include the processor (e.g., 210, 212, 214, 216, 218, 252, 260, 432).

The processor may then perform the operations of block 1106 of the method 1100 as described.

With reference to FIG. 13, following the operations of block 1102 of the method 1100, the processor may adjust a DCVS and a task queue position of the data based on a time remaining in the latency budget in block 1302. Means for performing functions of the operations in block 1302 may include the processor (e.g., 210, 212, 214, 216, 218, 252, 260, 432).

The processor may then perform the operations of block 1106 of the method 1100 as described.

With reference to FIG. 14, following the operations of block 1102 of the method 1100, the processor may adjust a compression ratio of the data for processing as part of the computing task based on the determined factors and the latency budget in block 1402. Means for performing functions of the operations in block 1402 may include the processor (e.g., 210, 212, 214, 216, 218, 252, 260, 432).

The processor may then perform the operations of block 1108 of the method 1100 as described.

Figure 15:
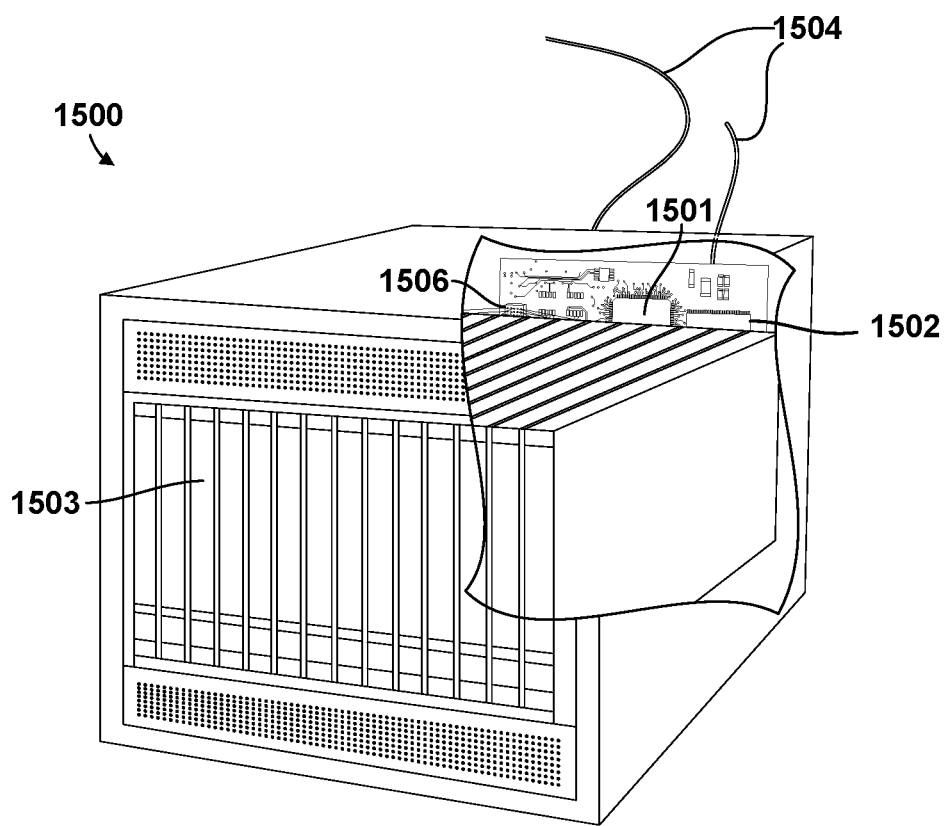
FIG. 15 is a component block diagram of a network computing device suitable for use with various embodiments.

Various embodiments, including the method and operations 1100-1400, may be performed in a variety of network computing devices (e.g., in a server device), an example of which is illustrated in FIG. 15 that is a component block diagram of a network computing device 1500 suitable for use with various embodiments. Such network computing devices may include at least the components illustrated in FIG. 15. With reference to FIGS. 1-15, a network computing device 1500 may include a processor 1501 coupled to volatile memory 1502 (e.g., 430) and a large capacity nonvolatile memory, such as a disk drive 1503. The network computing device 1500 may also include a peripheral memory access device such as a floppy disc drive, compact disc (CD) or digital video disc (DVD) drive 1506 coupled to the processor 1501. The network computing device 1500 may also include network access ports 1504 (or interfaces) coupled to the processor 1501 for establishing data connections with a network, such as the Internet and/or a local area network coupled to other system computers and servers. The network computing device 1500 may be connected to one or more antennas for sending and receiving electromagnetic radiation that may be connected to a wireless communication link. The network computing device 1500 may include additional access ports, such as USB, Firewire, Thunderbolt, and the like for coupling to peripherals, external memory, or other devices.

Figure 16:
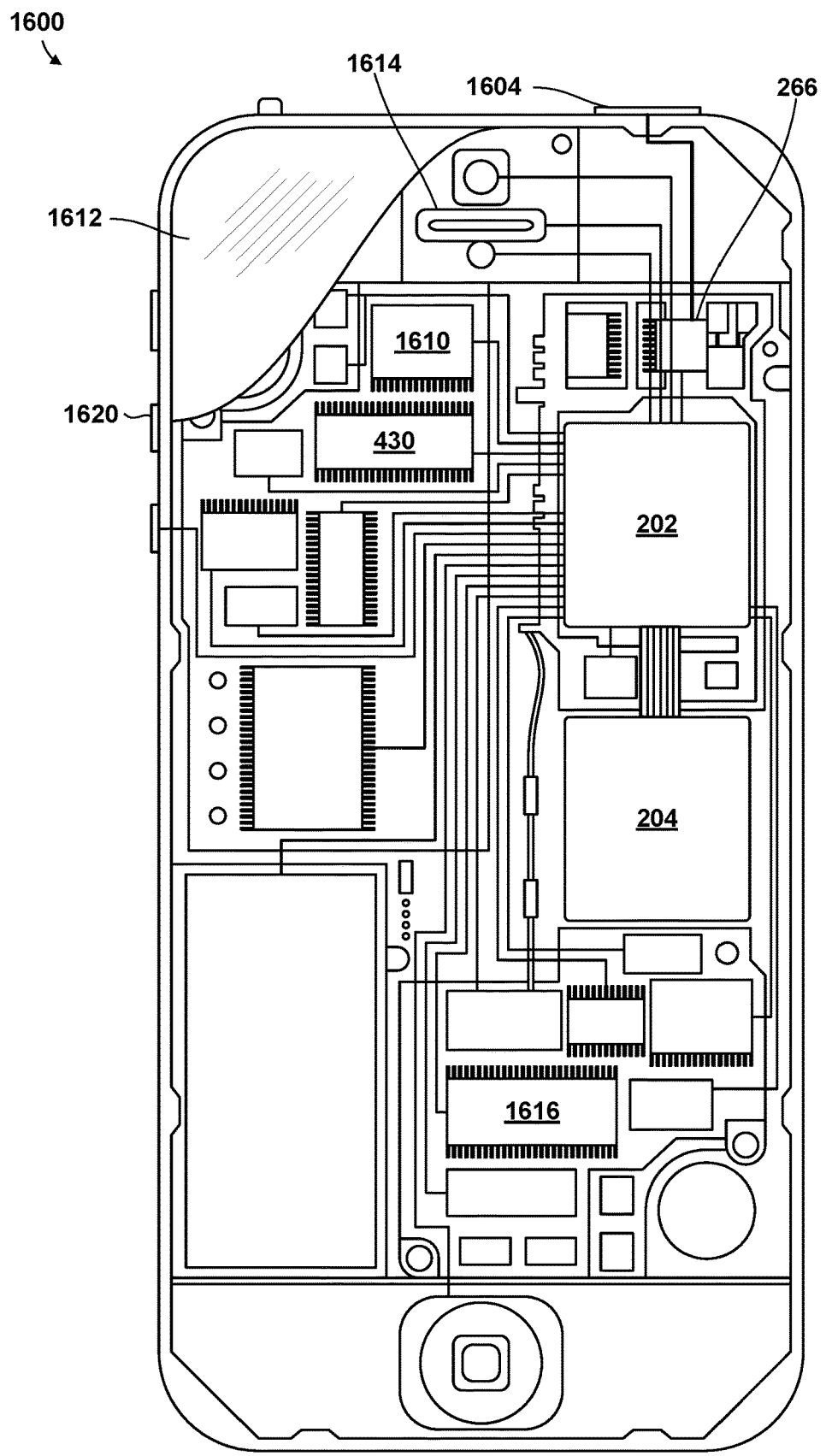
FIG. 16 is a component block diagram of a wireless device suitable for use with various embodiments.

Various embodiments, including the methods and operations 700, 800, 900, 1000, may be performed in a variety of wireless devices (e.g., the wireless device 120a-120e, 200, 320, 402), an example of which is illustrated in FIG. 16 that is a component block diagram of a wireless device 1600 suitable for use with various embodiments. With reference to FIGS. 1-16, a wireless device 1600 may include a first SOC 202 (e.g., a SOC-CPU) coupled to a second SOC 204 (e.g., a 5G capable SOC). The first and second SOCs 202, 204 may be coupled to internal memory 430, 1616, a display 1612, and to a speaker 1614. Additionally, the wireless device 1600 may include an antenna 1604 for sending and receiving electromagnetic radiation that may be connected to a wireless data link and/or cellular telephone transceiver 266 coupled to one or more processors in the first and/or second SOCs 202, 204. The wireless device 1600 may also include menu selection buttons or rocker switches 1620 for receiving user inputs.

The wireless device 1600 also may include a sound encoding/decoding (CODEC) circuit 1610, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1610 may include a digital signal processor (DSP) circuit (not shown separately).

The processors of the network computing device 1600 and the wireless device 1600 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Software applications may be stored in the memory 426, 430, 1616 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods described above may be substituted for or combined with one or more operations of the methods described above.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a wireless device for processing data using computing resources of a remote network computing device, comprising:
   determining factors affecting a round-trip latency of a computing task;
   generating first metadata including the determined factors and a latency budget for the computing task;
   sending the first metadata including the determined factors and the latency budget and data to the remote network computing device for processing as part of the computing task;
   receiving from the remote network computing device processed data of the computing task and second metadata including an indication of a remaining time in the latency budget; and
   adjusting a processing time for post-processing the processed data based on the second metadata to complete the post-processing of the processed data within the latency budget.

2. The method of claim 1, wherein determining factors affecting the round-trip latency of a computing task comprises determining one or more of a wireless device pre-processing time, a first communication time from the wireless device to the remote network computing device, a remote network computing device processing time, a second communication time from the remote network computing device to the wireless device, or a wireless device post-processing time.

3. The method of claim 1, wherein adjusting the processing time for post-processing the processed data based on the second metadata to complete the post-processing of the processed data within the latency budget comprises adjusting a dynamic clock and voltage scaling (DCVS) and a dynamic task priority assignment of the processed data based on a time remaining in the latency budget.

4. The method of claim 1, wherein adjusting the processing time for post-processing the processed data based on the second metadata to complete the post-processing of the processed data within the latency budget comprises adjusting a DCVS and a task queue position of the processed data based on a time remaining in the latency budget.

5. The method of claim 1, wherein the processed data of the computing task received from the remote network computing device is not a completed work product.

6. The method of claim 1, further comprising adjusting a compression ratio of the data for processing as part of the computing task based on the determined factors and the latency budget.

7. A wireless device, comprising at least one processor configured with processor-executable instructions to:
   determine factors affecting a round-trip latency of a computing task;
   generate first metadata including the determined factors and a latency budget for the computing task;
   send the first metadata including the determined factors and the latency budget and data to a remote network computing device for processing as part of the computing task;
   receive from the remote network computing device processed data of the computing task and second metadata including an indication of a remaining time in the latency budget; and
   adjust a processing time for post-processing the processed data based on the second metadata to complete the post-processing of the processed data within the latency budget.

8. The wireless device of claim 7, wherein the at least one processor is further configured with the processor-executable instructions to determine one or more of a wireless device pre-processing time, a first communication time from the wireless device to the remote network computing device, a remote network computing device processing time, a second communication time from the remote network computing device to the wireless device, or a wireless device post-processing time.

9. The wireless device of claim 7, wherein the at least one processor is further configured with the processor-executable instructions to adjust a dynamic clock and voltage scaling (DCVS) and a dynamic task priority assignment of the processed data based on a time remaining in the latency budget.

10. The wireless device of claim 7, wherein the at least one processor is further configured with the processor-executable instructions to adjust a DCVS and a task queue position of the processed data based on a time remaining in the latency budget.

11. The wireless device of claim 7, wherein the at least one processor is further configured with the processor-executable instructions such that the processed data of the computing task received from the remote network computing device is not a completed work product.

12. The wireless device of claim 7, wherein the at least one processor is further configured with the processor-executable instructions to adjust a compression ratio of the data for processing as part of the computing task based on the determined factors and the latency budget.

13. A method performed by a network computing device for processing data in support of a remote wireless device, comprising:
receiving first metadata and data for processing as part of a computing task from the remote wireless device, the first metadata including factors affecting a round-trip latency and a latency budget for the computing task;
adjusting a processing time for processing the data based on the first metadata and the latency budget;
generating second metadata including an indication of a remaining time in the latency budget; and
sending processed data and the second metadata to the remote wireless device in a format that enables post-processing by the remote wireless device.

14. The method of claim 13, wherein receiving the first metadata and data for processing as part of a computing task from the remote wireless device comprises receiving one or more of a remote wireless device pre-processing time, a first communication time from the remote wireless device to the network computing device, a network computing device processing time, a second communication time from the network computing device to the remote wireless device, or a remote wireless device post-processing time.

15. The method of claim 13, wherein adjusting the processing time for processing the data based on the first metadata and the latency budget comprises adjusting a dynamic clock and voltage scaling (DCVS) and a dynamic task priority assignment of the data based on a time remaining in the latency budget.

16. The method of claim 13, wherein adjusting the processing time for processing the data based on the first metadata and the latency budget comprises adjusting a DCVS and a task queue position of the data based on a time remaining in the latency budget.

17. The method of claim 13, further comprising adjusting a compression ratio of the processed data based on the factors affecting the round-trip latency and the latency budget.

18. A network computing device, comprising at least one processor configured with processor-executable instructions to:
receive first metadata and data for processing as part of a computing task from a remote wireless device, the first metadata including factors affecting a round-trip latency and a latency budget for the computing task;
adjust a processing time for processing the data based on the first metadata and the latency budget;
generate second metadata including an indication of a remaining time in the latency budget; and
send processed data and the second metadata to the remote wireless device in a format that enables post-processing by the remote wireless device.

19. The network computing device of claim 18, wherein the at least one processor is further configured with the processor-executable instructions to receive one or more of a remote wireless device pre-processing time, a first communication time from the remote wireless device to the network computing device, a network computing device processing time, a second communication time from the network computing device to the remote wireless device, or a remote wireless device post-processing time.

20. The network computing device of claim 18, wherein the at least one processor is further configured with the processor-executable instructions to adjust a dynamic clock and voltage scaling (DCVS) and a dynamic task priority assignment of the data based on a time remaining in the latency budget.

21. The network computing device of claim 18, wherein the at least one processor is further configured with the processor-executable instructions to adjust a DCVS and a task queue position of the data based on a time remaining in the latency budget.

22. The network computing device of claim 18, wherein the at least one processor is further configured with the processor-executable instructions to adjust a compression ratio of the processed data based on the factors affecting the round-trip latency and the latency budget.

* * * * *